SMITH & THURSTON.
Corn Planter.
No. 62,080. Patented Feb. 12, 1867.
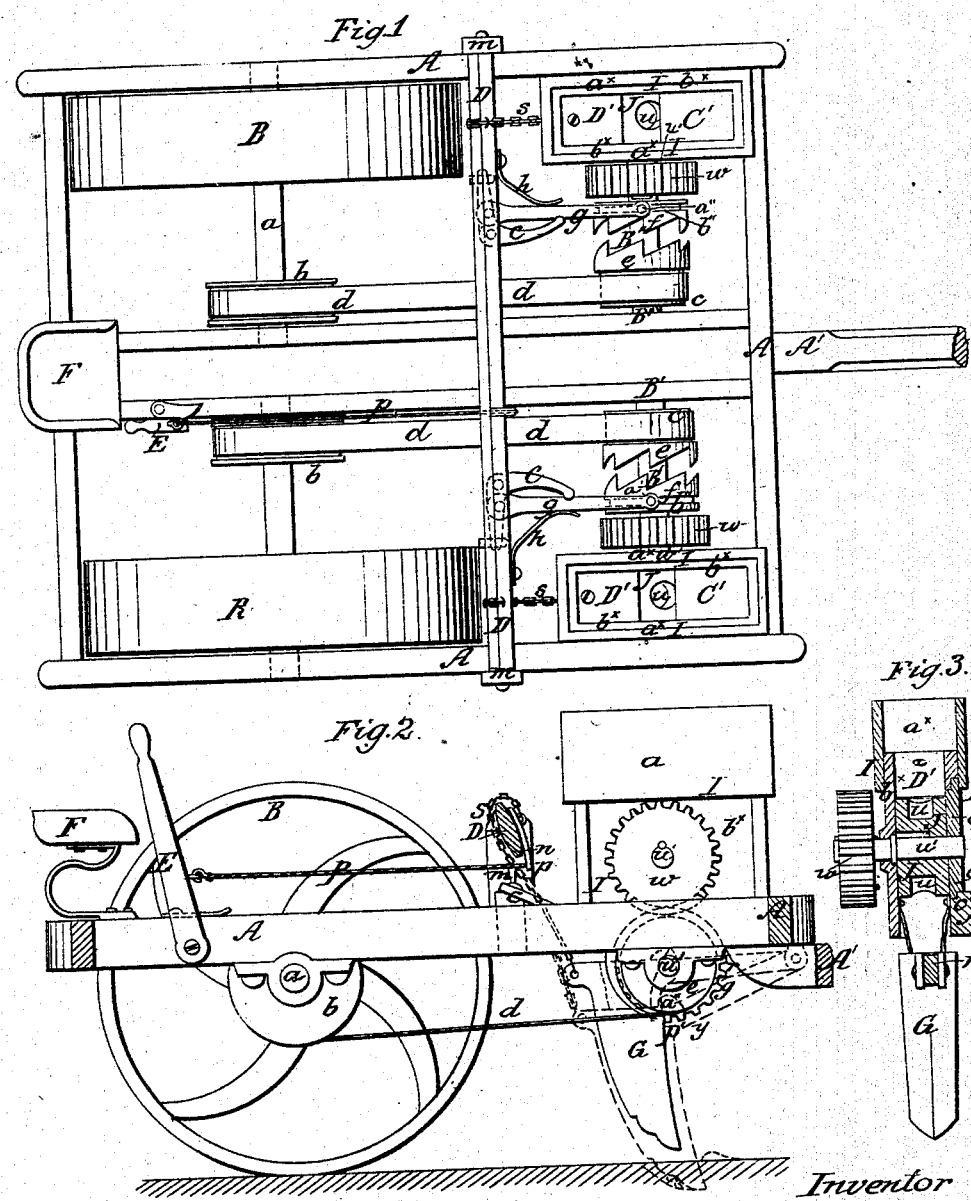

United States Patent Office.

FREDERICK F. SMITH AND ADNAH THURSTON, OF FOUR CORNERS, OHIO.

Letters Patent No. 62,080, dated February 12, 1867.

IMPROVEMENT IN SEEDING MACHINE.

*The Schedule referred to in these Letters Patent and making part of the same.*

TO ALL WHOM IT MAY CONCERN:

Be it known that we, FREDERICK F. SMITH and ADNAH THURSTON, both of Four Corners, in the county of Erie, and State of Ohio, have invented certain new and useful Improvements in Seeding Machines; and we do hereby declare that the following is a full, clear, and exact description of the same, reference being had to the accompanying drawings, making a portion of this specification, in which—

Figure 1 is a plan or top view of a seeding machine constructed according to my invention.
Figure 2 is a central vertical section of the same.
Figure 3 is a detached vertical transverse section of a portion of the same.
Similar letters of reference indicate corresponding parts in all the figures.

This invention relates to that class of seeding machines in which seeding stocks or shares are employed to open furrows for the reception of seed passed downward through the stocks or shares by suitable mechanism; and it consists in a novel combination of a lever with the seeding stocks or shares and the clutches by which motion is communicated to the mechanism which regulates the downward passage of the seed, whereby the said stocks may be raised clear from the ground simultaneously with the stopping or throwing out of gear of the said mechanism, so that the machine may be brought into position to be drawn or moved from place to place when not in operation, with very great facility. The invention further consists in a novel arrangement of parts, whereby the cylinders which constitute the main portions of the mechanism which regulates the downward passage of the seed, may be readily changed in order to adapt the machine to sowing or planting different quantities or varieties of seed.

To enable others to understand the construction and operation of my invention, I will proceed to describe it with reference to the drawings.

The main frame of the machine is shown at A, and is furnished with a draught-pole, A', and supported upon the two driving-wheels B, each of which is secured upon the outer end of an independent axle, $a$, these axles $a$ being situated in line with each other, as shown in fig. 1, and furnished, at their inner ends, each with a pulley or band-wheel, $b$. Situated at the forward end of the frame A, in line with each other and parallel with the axles $a$, are two shafts, B', upon the inner end of each of which is secured a loose pulley, $c$, which is connected with the band-wheel $b$, behind it, by a belt, $d$. Each of the pulleys $c$ has attached to one side thereof one portion, $e$, of a clutch, $e f$, the sliding part $f$ of which is made to rotate with the shaft B', on which it is placed, by means of a longitudinal feather formed upon the said shaft. The sliding part $f$ of each clutch is moved by means of a pivoted arm, $g$, the forward end of which is constructed with a yoke, indicated in dotted lines in fig. 1, the ends of which are furnished with pins, $a''$, which project inward into a circumferential groove, $b''$, formed in the said sliding portion $f$ of the clutch. The aforesaid sliding portions of the clutch $e f$ are forced inward toward the other portions thereof by a spring, $h$, attached to the frame A, and acting upon the arm $g$, as represented in fig. 1. C indicates pivoted bent levers, the pivot of each one of which is situated at a little distance from the pivot of one of the arms $g$, at the inner side thereof, each of the said bent levers being so arranged, in relation with the contiguous arm $g$, that when its transverse or rear part (shown in dotted lines in fig. 1) is forced backward it will operate the said arm to move the portion $f$ of the clutch connected therewith away from the other portion $e$ of the said clutch, as will be hereinafter fully set forth. Situated over the rearmost ends of the arms $g$ and bent levers C is a strong transverse tilting board, D, the ends of which are pivoted in suitable bearings formed in the upper extremities of uprights, $m$, attached to the lateral edges of the frame A. One edge of this tilting board is furnished with outwardly projecting spurs, $n$, which extend upward when the machine is in operation, but which, when the board is tilted or turned over, as shown more clearly in fig. 2, strike the transverse or rearmost parts of the levers C, and force the same backwards. Attached to the same edge of the tilting board D as the spurs $n$, just mentioned, is a strong cord or chain, $p$, which is passed down in front of the said board, and thence back underneath the same, and has its rearmost extremity attached to the lever E, which has its lower end pivoted to the frame A, and which is situated in convenient proximity to the driver's seat F. The hollow or tubular seeding stocks are shown at G, and may be of any ordinary or suitable construction, and are connected with the forward end of the frame A by pivoted links or bars, $r$, the seeding stocks being attached to the rear ends of the aforesaid links to transverse pins, $r'$ and $r''$. Of these pins the lowermost ones, $r'$, should be made of metal, while the uppermost ones, $r''$, which pass over the upper edges of the bars or links $r$, are intended to be made of wood, in order that in the event of one of the seeding stocks striking an obstacle with very great or unusual force, the wooden pin $r''$ thereof will break and allow the stock to swing backward, thus preventing any serious injury to the machine from the concussion. Attached to the rearmost side of each seeding stock is a chain, $s$, the upper end of which is passed under the tilting board D, and is secured to the rearmost side of the said tilting board, as shown in red outline in fig. 2. By pulling the lever E backwards, the cord or chain $p$ tilts the tilting board D, bringing its upper edge downward, which, drawing upon the chains $s$ lifts or elevates the seeding stock G clear from the ground at the same time that the spurs $n$, striking the transverse or rear parts of the bent levers C, move the said rear parts or arms of the aforesaid levers back, and thus cause the pivoted arm $g$ to bring the sliding parts $f$ of the clutches $e\,f$ away from the other parts $e$ thereof, thus stopping the motion of the shafts B', and, inasmuch as the mechanism by which the flow or passage of the seed downward to the seeding stocks is regulated, as will be presently fully set forth, receives its motion from the said shafts B', it follows that the motion of the said mechanism is stopped simultaneously with the raising of the seeding stocks G, so that a single movement of the lever E suffices to bring the several parts into proper position to enable the machine to be drawn along without operating the same. Situated at the forward portion of the frame A, in line with each of the driving-wheels B, is a hopper, I, the upper part $a^*$ of which is made removable, as will presently be explained, and which may be of any desired or suitable form, but the lower portion $b^*$ of which is intended to be made with flat sides, and has situated within it, and working upon a transverse axis, a seed-dropping cylinder, J, which is furnished with conical or other suitably shaped measuring recesses, $u$, formed in its circumference at suitable distances apart, and the office of which is to carry or distribute the seed from the upper portion of the hopper to the seeding stock situated below the same, the said stock being connected with the opening in the under side of the hopper by means of a flexible tube, $v$. The quantity of seed dropped or passed downward at each revolution of the cylinder J being regulated by the aggregate size of the recesses $u$, and the distance apart at which it is dropped in the furrow formed by the seeding stock being regulated by the distances apart of the aforesaid recesses $u$, the grain passing to the cylinder between the two inclined plates C' D', situated within the hopper and above the said cylinder. The inner end of the shaft or pivot $u'$ of each cylinder J projects through the inner side of the hopper I, and has a spur-wheel, $w$, upon it, and gearing into a similar spur-wheel, $y$, secured upon the adjacent shaft B', the said shaft B' thus communicating motion to the cylinders J, or, in other words, to the mechanism that regulates the passage of the seed through the seeding stocks to the ground, as hereinbefore mentioned. Formed in the outermost side of the lower part $b^*$ of each hopper is an opening through which the cylinder is passed into the said part of the hopper, the said opening being closed by a plate, $c^*$, as shown in fig. 3, and in which is formed the bearing of the outer end of the shaft $u$ of the cylinder. This plate has its top and lateral edges situated in a rebate formed around the corresponding edges of the aforesaid opening, and the bottom or lower edge thereof is fitted in a longitudinal groove formed in the frame A, as shown at $c''$, in fig. 3. When the upper part $a^*$ of the hopper is fitted upon the lower part $b^*$ thereof, the lower edge of the said upper part $a^*$ extends below the upper edge of the plate $c^*$, and holds the same securely in place when it is desired to remove the cylinders J in order to substitute others fitted for dropping a variety of seed or for dropping the seed in greater or less quantities. The upper parts $a^*$ of the hoppers are first taken off; the plates $c^*$ are then removed, and the change of cylinders may be easily effected, so that by this means the machine may be adjusted for seeding with any variety of seed with very great facility.

What we claim as our invention, and desire to secure by Letters Patent, is—

1. So combining the lever E with the seeding stocks G and clutches $e\,f$ that the movements of the said levers will elevate the seeding stocks simultaneously with the operation of the clutches to stop the motion of the seed-dropping mechanism, substantially as herein set forth.

2. The retention of the plate $c^*$ in its place with reference to the cylinder J and hopper I, by means of the groove $c''$ and removable upper part $a^*$ of the aforesaid hopper, substantially as herein set forth for the purpose specified.

FREDERICK F. SMITH,
ADNAH THURSTON.

Witnesses:
FREDERICK D. DRAKE,
JOHN ROBERTS.